350-96.23 SR

6/4/85 XR 4,521,767

United States Patent [19]

Bridge

[11] Patent Number: 4,521,767

[45] **Date of Patent: * Jun. 4, 1985**

[54] COMPOSITE STRIP

[76] Inventor: Richard F. Bridge, Coach House, Windmill La., Burlesdon, Hampshire, England

[ * ] Notice: The portion of the term of this patent subsequent to Dec. 22, 1998 has been disclaimed.

[21] Appl. No.: 274,723

[22] Filed: Jun. 18, 1981

Related U.S. Application Data

[63] Continuation of Ser. No. 967,645, Dec. 8, 1978, Pat. No. 4,307,386.

[30] Foreign Application Priority Data

| | | | |
|---|---|---|---|
| Dec. 9, 1977 | [GB] | United Kingdom | 51444/77 |
| May 3, 1978 | [GB] | United Kingdom | 40412/77 |

[51] Int. Cl.[3] .......................... G08B 13/18; G02B 5/14

[52] U.S. Cl. .................................... 340/555; 340/531; 156/303.1; 350/96.23

[58] Field of Search ............... 340/555, 556, 564, 531; 350/96.23; 156/176, 177, 178, 158, 298, 303.1

[56] References Cited

U.S. PATENT DOCUMENTS

| | | | |
|---|---|---|---|
| 3,110,891 | 11/1963 | Herrick et al. | 340/564 |
| 3,454,261 | 7/1969 | Nachazel | 256/2 |
| 3,623,057 | 11/1971 | Hedin et al. | 340/577 |
| 3,688,298 | 8/1972 | Miller et al. | 340/577 |
| 3,714,644 | 1/1973 | Hellstrom | 340/508 |
| 3,825,916 | 7/1974 | Steel et al. | 340/557 |
| 3,898,639 | 8/1975 | Mucheryan | 340/529 |
| 3,938,124 | 2/1976 | Way et al. | 340/531 |
| 4,028,081 | 6/1977 | Marcatili | 350/96.23 X |
| 4,029,390 | 6/1977 | Chinnock et al. | 156/158 X |
| 4,090,902 | 5/1978 | Ferrentino et al. | 156/177 |
| 4,144,530 | 3/1979 | Redfern | 340/531 X |
| 4,147,407 | 4/1979 | Eichenbaum et al. | 350/96.23 X |
| 4,207,561 | 6/1980 | Steensma | 340/531 |
| 4,275,294 | 6/1981 | Davidson | 340/555 X |
| 4,307,386 | 12/1981 | Bridge | 340/555 |

FOREIGN PATENT DOCUMENTS

| | | | |
|---|---|---|---|
| 2039683 | 8/1980 | United Kingdom | 340/531 |

*Primary Examiner*—Glen R. Swann, III

*Attorney, Agent, or Firm*—Larson and Taylor

[57] ABSTRACT

A composite strip for use in a security system comprises an integrally barbed or serrated carrier strip having a longitudinal groove therein. A fibre-optic filament is disposed in the groove and is held therein by means of an adhesive strip which is applied to the carrier strip so as to overlie the groove. Such a composite strip may provide security against unauthorized crossing of a boundary by directing light into one end of the filament and detecting the light leaving the other end of the filament. An indication is given when the optical intensity of the detected light falls below a predetermined threshold, so as to warn when the fibre-optic filament has been disturbed significantly or cut through.

12 Claims, 3 Drawing Figures

COMPOSITE STRIP

This application is a continuation of U.S. patent application Ser. No. 967,645 (now U.S. Pat. No. 4,307,386) of Richard F. Bridge, filed Dec. 8, 1978.

FIELD OF THE INVENTION

This invention is concerned with a composite strip incorporating a fibre-optic filament, e.g. for use in a security system.

BACKGROUND OF THE INVENTION

In British Patent Application No. 40412/77 corresponding to which is a U.S. patent application Ser. No. 943,693 of Roderick Iain Davidson, filed Sept. 19th 1978, now U.S. Pat. No. 4,275,294, there is disclosed a security system comprising fibre-optic wave guide means disposed to extend along a boundary, an energy source positioned to direct optical radiation along said guide means from one end, and a detector positioned to detect radiation leaving said guide means from its other end and arranged to change a state of said detector in response to any disturbances to said guide means other than negligible disturbances. The wave guide means can, for example, be installed in a wall or mounted in conduit disposed along the boundary in question. In a preferred security system, however, disclosed in the aforementioned British and U.S. patent applications, there is used an elongate body of the kind specified above which is in the form of a strip and includes a single fibre-optic filament. The strip is incorporated in a fence running along a boundary. Light is directed into one end of the fibre-optic filament and changes in detected light intensity at the other end of the filament, caused by significant movement of the strip or the strip being cut, are used to detect any attempt, even unsuccessful, to cross the boundary. Such changes in detected light intensity are used to operate an audible or visual alarm.

The aforementioned British and U.S. patent applications disclose a method of manufacturing the strip in which a fibre-optic filament is positioned against a core, having the form of a strip so as to extend longitudinally of the core, and then the core and the introduced filament are coated with material. In a typical example, the core is a steel strip and the coating material is zinc which is applied to the steel strip and fibre-optic filament by immersion in a molten zinc bath. For practical reasons, this method of manufacture is not always wholly satisfactory.

BRIEF DESCRIPTION OF THE INVENTION

According to the present invention from one aspect there is provided a composite strip comprising an integrally barbed or serrated carrier strip having a longitudinal groove therein, a fibre-optic filament disposed in said groove, and an adhesive strip applied to the carrier strip so as to overlie said groove and cover the fibre-optic filament.

The carrier strip can be made of steel or of a galvanized strip painted with plastics-based paint, and the filament can be enclosed in a plastics sheathing.

The barbs or serrations can be formed at intervals along each longitudinal edge of the strip.

According to the invention from a second aspect there is provided a security system having at least one composite strip which comprises an integrally barbed or serrated carrier strip having a longitudinal groove therein, a fibre-optic filament disposed in said groove, and an adhesive strip applied to the carrier strip so as to overlie said groove and cover the fibre-optic filament. The security system may comprise a fence, wall or the like, disposed to extend along a given boundary, and the fibre-optic filament may run along the boundary, there being an energy source positioned to direct optical radiation along said filament from one end and a detector positioned to detect radiation leaving said filament from the other end and arranged to change its state in response to a change in detected radiation outside a predetermined range. A strand may run longitudinally of the fence, wall or the like, this strand being of identical appearance externally to the said composite strip but not including any fibre-optic filament.

In accordance with the invention from a third aspect, there is provided a method of making a composite strip comprising positioning a fibre-optic filament within a longitudinal groove formed in an integrally barbed or serrated carrier strip, and securing an adhesive strip to the carrier strip so as to overlie said groove and cover the fibre-optic filament.

Preferably, the carrier strip is formed with longitudinally extending groove means into which the filament is introduced for positioning against the carrier. The barbs or serrations can be formed at intervals along longitudinal edges of the strip by a stamping process.

The filament may be held within the groove by a bonding agent, and arranging the adhesive strip to overlie the bonding agent.

The bonding agent may be a one-part or a two-part resin.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
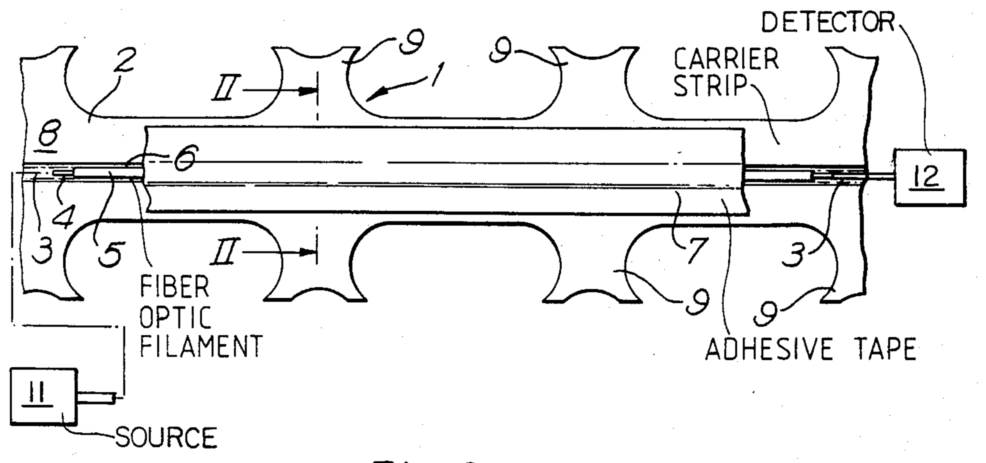
FIG. 1 is a plan view of a barbed strip.
Figure 2:
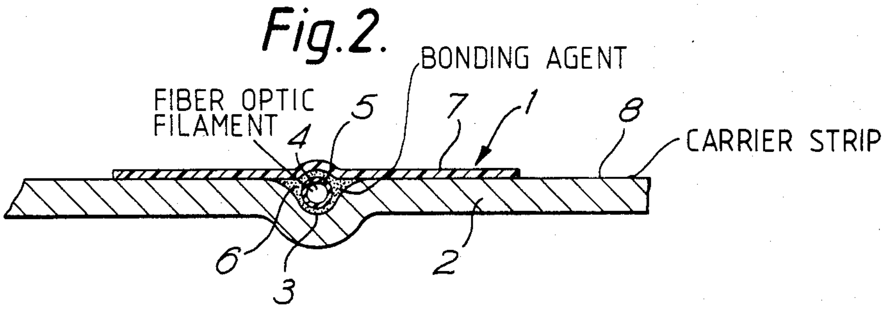
FIG. 2 is a part-sectional view on an enlarged scale taken along the line II—II of FIG. 1.

Referring to the FIGS. 1 and 2 a strip 1 of bendable material for use in a security system comprises a carrier strip 2, which can be made of a steel but which may be a galvanized strip painted with a protective plastics-based paint, formed with a longitudinal groove 3 running along the centre of one (8) of its two principal faces. Located in this groove is a single fibre-optic filament 4, of ordinary commercial quality, with a sheathing 5 of plastics material which assists in protecting the filament. The sheathed fibre-optic filament is held in the groove by means of a suitable bonding agent 6, which may be a two-part flexible resin, and a strip of adhesive tape 7 is applied to the principal face 8 of the strip 1 so as to cover the bonding agent in the groove 3 and also the adjacent surface areas of the principal face 8.

The strip is formed with barbs or serrations 9 at spaced intervals along its two longitudinal edges, although the provision of the barbs is not essential.

In accordance with a preferred method of manufacturing the barbed strip 1, the following manufacturing steps are carried out:

1. Edge portions of a length of carrier strip having straight longitudinal edges are punched away from both edges so as to provide the barbs or serrations 9.
2. The central groove 3 is formed in the steel strip 2 for example by passing the strip between a pair of male and female rollers. The steps 1 and 2 can be reversed, if desired.
3. Initiator chemical is smeared into the groove 3 and simultaneously resin, such as epoxy resin, is applied to the fibre-optic filament which is held ready to be introduced into the groove 3 so as to enrobe it. As an alternative to such two-part bonding agents, a single part bonding agent may be used, in which case this bonding agent is applied to the groove and/or the fibre-optic filament.
4. Introduction of the filament into the groove can now be effected. The bonding agent then becomes cured to secure the filament in position.

The manufacturing steps can be effected in a continuous manufacturing process in which the strip is unwound from a reel and passed successively through a punching station, preferably using rotary punches, a rolling station to form the longitudinal groove (the order of these two stations can be reversed) and a fibre-optic filament introducing station, and is then re-wound at a re-reeling station. The one or two-part bonding agent is applied at a suitable place or places. To prevent successive turns on the take-up reel from becoming bonded together by the cured bonding agent, it is necessary to take an appropriate step, such as applying the adhesive tape 7 to the principal face 8 so as to cover the bonding agent in the groove and overlie the adjacent surface areas of the principal face 8. This enables the finished strip to be wound into a reel even before the bonding agent has become fully cured. Alternatively, the bonding agent can be cured at a stoving station between the fibre-optic filament introducing station and re-reeling station.

The barbed strip is intended to be used in a corresponding manner to the strip disclosed in the aforementioned U.S. patent application Ser. No. 943,693 as described with particular reference to FIGS. 2 and 3 of that application, and reference is accordingly directed to that application. In a development of the use there disclosed, it is possible to direct a pulsed light beam from an energy source 11 into one end of the fibre-optic filament 4 with a view to enabling larger light intensities to be transmitted for a given transmitting power, thus enabling longer boundaries to be monitored by an optical detector 12 and associated warning device. For greater security, the pulses may be coded and the detector arranged to operate the warning device if the preselected code is not detected.

The use of a bonding agent is not essential where adhesive tape is used since this tape alone can hold the fibre-optic filament in position.

Figure 3:
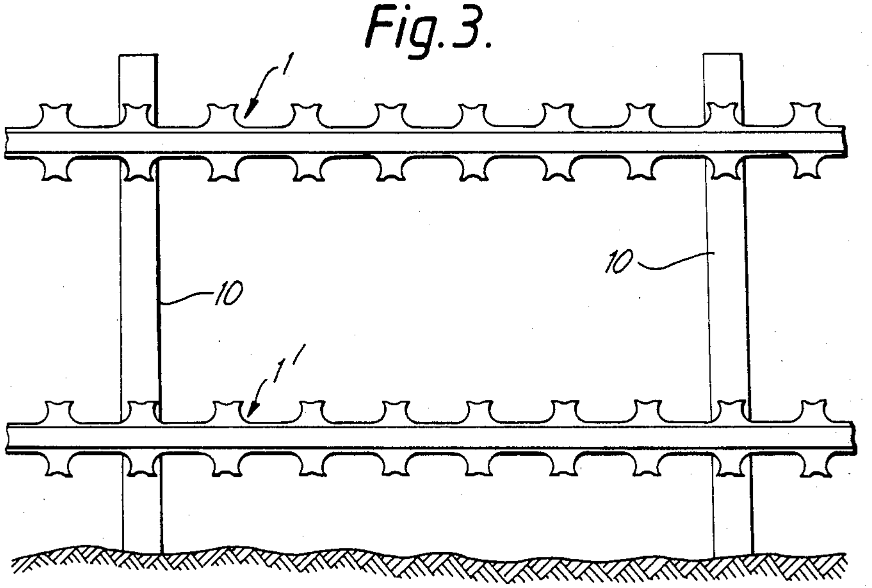
FIG. 3 illustrates one preferred way of using the barbed strip in a security fence.

In a preferred security system using more than one strip running along the boundary in question, at least one of the strips connecting adjacent posts incorporates a fibre-optic filament, for example of the construction disclosed herein or in the aforementioned British and U.S. patent applications, and its associated optical source and detector/warning system but at least one further strip is employed being a "dummy" strip of identical external appearance to the fibre-optic strip but not incorporating any fibre-optic filament. Such an arrangement is shown in FIG. 3 to which reference is now directed. In this arrangement, a single fibre-optic strip and a single "dummy" strip are used, these strips being respectively denoted by references 1 and 1'. The fence posts are denoted by reference numeral 10. The advantage of such an arrangement is that since the cost of the "dummy" strip is obviously considerably less than that of the fibre-optic strip, the cost of installing the fence is correspondingly reduced. On the other hand, a similar measure of security is provided because an intruder, aware that a fibre-optic filament security system is being used, would not risk disturbing either strip in case that strip is the one containing the fibre-optic filament. In a modification, the "dummy" strip contains an electrical conductor such as a copper wire through which a current is passed for use in detecting if the wire is cut by an intruder. The cost of the fence would still be significantly less than if both strips were fibre-optic strips. Where more than one "dummy" strip is used, one or more may include an electric conductor whilst the remaining "dummy" strip(s) contain(s) no such conductor(s).

Lastly, it is mentioned that the strips may be twisted longitudinally so that barbs are provided extending in different directions. Alternatively, the barbs may be bent in alternate or random directions to achieve the same effect.

I claim:

1. A composite strip comprising a metal carrier strip having a main portion, means forming a longitudinal groove in said main portion, a plurality of metal barbs or serrations which extend from said main portion and are integral therewith, a fibre-optic filament disposed in said groove, and an adhesive strip applied to the main portion only of the carrier strip so as to overlie said groove and cover the fibre-optic filament without covering said barbs or serrations.

2. A composite strip as claimed in claim 1 in which the adhesive strip has longitudinal edges which are disposed inwardly of longitudinal edges of the said main portion.

3. A composite strip as claimed in claim 1 or 2 in which the fibre-optic filament is held within the groove by a bonding agent, the adhesive strip overlying the bonding agent.

4. A strip according to claim 3 wherein the bonding agent is a two-part flexible resin.

5. A strip according to claim 1 or 2 wherein the carrier strip is made of steel.

6. A strip according to claim 1 or 2 wherein the carrier strip is made of a galvanized strip painted with plastics-based paint.

7. A strip according to claim 1 or 2 wherein the filament is enclosed in a plastics sheathing.

8. A method of making a composite strip comprising positioning a fibre-optic filament within a longitudinal groove formed in a main portion of a metal carrier strip which has metal barbs or serrations which extend from said main portion and are integral therewith, and securing an adhesive strip to the main portion only of the carrier strip so as to overlie said groove and cover the fibre-optic filament without covering said barbs or serrations.

9. A method as claimed in claim 8 comprising holding the filament within the groove by a bonding agent, and arranging the adhesive strip to overlie the bonding agent.

10. A method of making and reeling a composite strip comprising positioning a fibre-optic filament within a longitudinal groove formed in a main portion of a metal carrier strip which has metal barbs or serrations which extend from said main portion and are integral therewith, holding the filament within the groove by a bonding agent, securing an adhesive strip to the main portion only of the carrier strip so as to overlie said groove and cover the fibre-optic filament and bonding agent without covering said barbs or serrations, and winding the composite strip so formed onto a reel, the adhesive strip preventing successive turns on the reel from becoming bonded together by the bonding agent.

11. A security system having at least one composite strip comprising a metal carrier strip having a main portion, means forming a longitudinal groove in said main portion, a plurality of metal barbs or serrations which extend from said main portion and are integral therewith, a fibre-optic filament disposed in said groove, and an adhesive strip applied to the main portion only of the carrier strip so as to overlie said groove and cover the fibre-optic filament without covering said barbs or serrations.

12. A security system comprising a plurality of spaced apart supports disposed to extend along a given boundary; a first strand running along the boundary and supported by said supports, said first strand comprising a metal carrier strip having a main portion, means forming a longitudinal groove in said main portion, a plurality of metal barbs or serrations which extend from said main portion and are integral therewith, a fibre-optic filament disposed in said groove, and an adhesive strip applied to the main portion only of the carrier strip so as to overlie said groove and cover the fibre-optic filament without covering said barbs or serrations; an energy source positioned to direct optical radiation along said fibre optic filament from one end; a detector positioned to detect radiation leaving said fibre optic filament from the other end and arranged to change the state thereof in response to a change in detected radiation outside a predetermined range; and a dummy strand which is supported by said supports but is otherwise unconnected to and is spaced from the first strand, said dummy strand being of identical appearance externally to the first strand but not including any fibre-optic filament.

* * * * *